United States Patent [19]

Blocha et al.

[11] Patent Number: 5,320,006

[45] Date of Patent: Jun. 14, 1994

[54] METHODS AND APPARATUS FOR PRODUCING OPHTHALMIC LENSES

[75] Inventors: John Blocha; Ronald T. Hyslop, both of Tulsa, Okla.

[73] Assignee: Coburn Optical Industries, Inc., Tulsa, Okla.

[21] Appl. No.: 876,403

[22] Filed: Apr. 30, 1992

Related U.S. Application Data

[63] Continuation-in-part of Ser. No. 766,394, Sep. 27, 1991, abandoned.

[51] Int. Cl.⁵ ............................................. B23B 5/36
[52] U.S. Cl. .............................. 82/1.11; 51/284 R; 82/11.3; 82/118
[58] Field of Search ................... 82/1.11, 11, 12, 118, 82/11.2, 11.3; 51/56 R, 284 R; 364/164; 409/131, 132

[56] References Cited

U.S. PATENT DOCUMENTS

| | | | |
|---|---|---|---|
| 3,589,078 | 6/1971 | Bala et al. | 51/165 |
| 4,016,784 | 4/1977 | Brown | 82/118 |
| 4,210,038 | 7/1980 | Hill | 82/11 |
| 4,343,206 | 8/1982 | Douglass et al. | 82/11 X |
| 4,493,168 | 1/1985 | Field, Jr. | 51/165.87 |
| 4,509,126 | 4/1985 | Olig et al. | 82/118 X |
| 4,602,540 | 7/1986 | Murofushi et al. | 82/118 |
| 4,653,360 | 3/1987 | Compton | 82/118 X |
| 4,674,029 | 6/1987 | Maudal | 364/148 |
| 4,907,373 | 3/1990 | Hunter et al. | 51/58 |
| 4,989,316 | 2/1991 | Logan et al. | 51/101 LG X |

*Primary Examiner*—Z. R. Bilinsky
*Attorney, Agent, or Firm*—Burns, Doane, Swecker & Mathis

[57] ABSTRACT

An initial curvature is cut into a lens blank in a lens making machine, such as a lathe, and the curvature is subsequently finished by a finishing tool. The finishing tool has curve characteristics which correspond to those of a prescription within a prescribed tolerance. The curvature of the finishing tool is measured on a digital gauge, and those measurements are fed to a digital controller which actuates the lathe. As a result, an initial curvature is cut into the lens blank having characteristics which correspond to those of the finishing tool. The finishing operation can thus be performed more quickly, since less material needs to be removed from the initial curvature during the finishing operation.

11 Claims, 3 Drawing Sheets

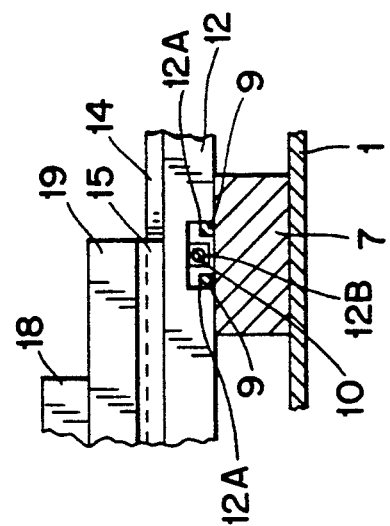
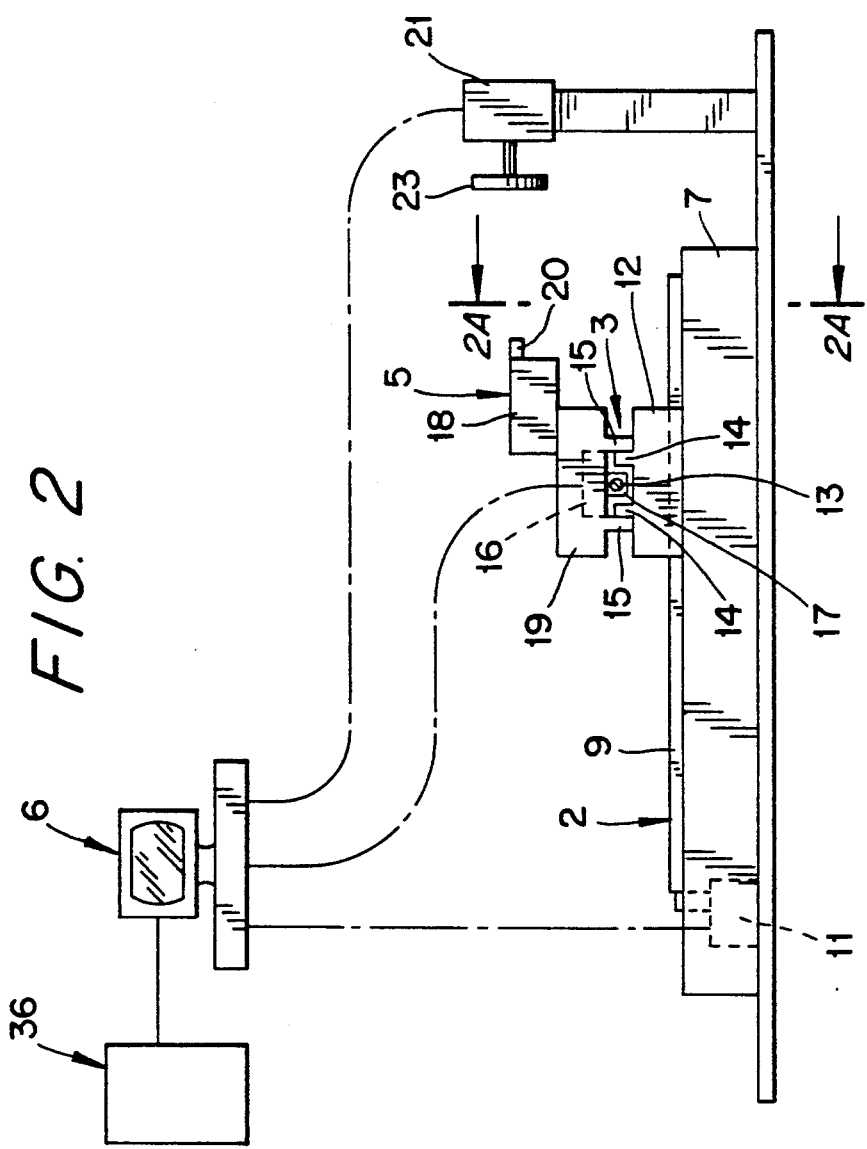

METHODS AND APPARATUS FOR PRODUCING OPHTHALMIC LENSES

RELATED APPLICATION

This is a Continuation-in-Part of U.S. patent application Ser. No. 07/766,394 filed Sep. 27, 1991 now abandoned.

BACKGROUND OF THE INVENTION

The present invention relates to the manufacture of ophthalmic lenses and, in particular, to methods and apparatus for producing a curvature in a lens blank.

Traditionally, a curvature, such as a spherical curvature or a toroidal curvature having base and cross curve characteristics, is formed in a lens blank by cutting an initial curvature in the lens blank in a generating machine, and then finishing the lens in a finishing apparatus.

The generating machine utilizes a cupped grinding tool mounted on a swing arm to cut a concave curvature which closely approximates a prescription curvature. The finishing procedure utilizes a finishing tool comprised of a support or lap and flexible finishing pads mounted on a convexly curved surface of the lap. The finishing procedure usually comprises a multitude of steps, e.g., usually two fining steps and a polishing step, with different pads being used for each step.

The lap is chosen so that the finishing surface has a curvature (defined by the curvature of the lap surface plus the thickness of the pads) which substantially corresponds to the prescription curvature within a prescribed tolerance.

During the finishing process, the lens surface and finishing surface are mated, and the lens surface is brought to the curvature of the finishing surface. The length of the finishing period is a function of the amount of nonconformity existing between the curvatures of the finishing surface and the initially cut lens surface; the greater the non-conformance-the longer the finishing period. Usually, the amount of nonconformity is great enough to require that two fining steps be performed prior to the polishing step, i.e., a rough fining step and a fine fining step.

Recently, a lens cutting lathe has been developed which enables an initial curvature to be cut in a lens surface which possesses an extremely high degree of dimensional precision and smoothness. Such a lathe is disclosed for example in commonly assigned U.S. patent application Ser. No. 07/766,394. Notwithstanding the accuracy and smoothness with which the initial lens curvature may be cut, it is still necessary to bring that curvature to the curvature of the finishing surface. Hence, even if the lens surface were initially at precisely the prescription curvature, an extensive finishing period could still be required in cases where the curvature of the finishing surface does not correspond to the prescription curvature. This is often the case, since laps are generally manufactured by methods which are less accurate than the above-described lathe.

It would be desirable, therefore, to shorten the finishing period, especially by taking advantage of the recently developed lens cutting lathe.

SUMMARY OF THE INVENTION

The present invention relates to a method of producing an ophthalmic lens wherein an initial curvature is cut into a lens blank and is thereafter finished by a finishing tool having finishing characteristics substantially corresponding to prescription curve characteristics within a prescribed tolerance. The finishing curve characteristics of the finishing tool are determined, and the initial curvature is produced in the lens blank such that any differences between the finishing curve characteristics and the prescription curve characteristics are incorporated into the initial curvature.

Preferably, the determining step includes measuring curve characteristics of a lap of the finishing tool on a digital gauge, and supplying signals from the gauge to a digital controller of the apparatus which produces the initial curvature.

In another aspect of the invention, an apparatus is provided for producing an initial curvature in an ophthalmic lens blank, the initial curvature being subsequently finished by a finishing tool having finishing curve characteristics substantially corresponding to prescription curve characteristics within a prescribed tolerance. The apparatus comprises a cutter tool and a supporting mechanism for supporting the lens blank and cutter tool and effecting relative movement therebetween for producing the initial curvature. A digital controller is connected to a supporting mechanism for supplying control signals thereto for effecting the production of the initial curvature characteristics. A digital gauge is connected to the digital controller for measuring lap curve characteristics of the finishing tool, and for delivering to the digital controller signals indicative of such measured characteristics such that the digital controller actuates the supporting mechanism for producing the initial curvature with characteristics corresponding to the finishing curve characteristics.

Preferably, the digital controller includes means for determining the finishing curve characteristics as a function of both the measured lap curvature and a thickness of finishing pads mounted thereon.

BRIEF DESCRIPTION OF THE DRAWING

The invention will now be described by way of description, of an example of a lathe made in accordance with the present invention, as illustrated in the accompanying drawings, in which:

FIG. 2 is a schematic side view of the apparatus shown in FIG. 1;

FIG. 2A is a fragmentary cross-sectional view taken along the line 2A—2A in FIG. 2;

DETAILED DESCRIPTION OF PREFERRED EMBODIMENTS OF THE INVENTION

Figure 1:
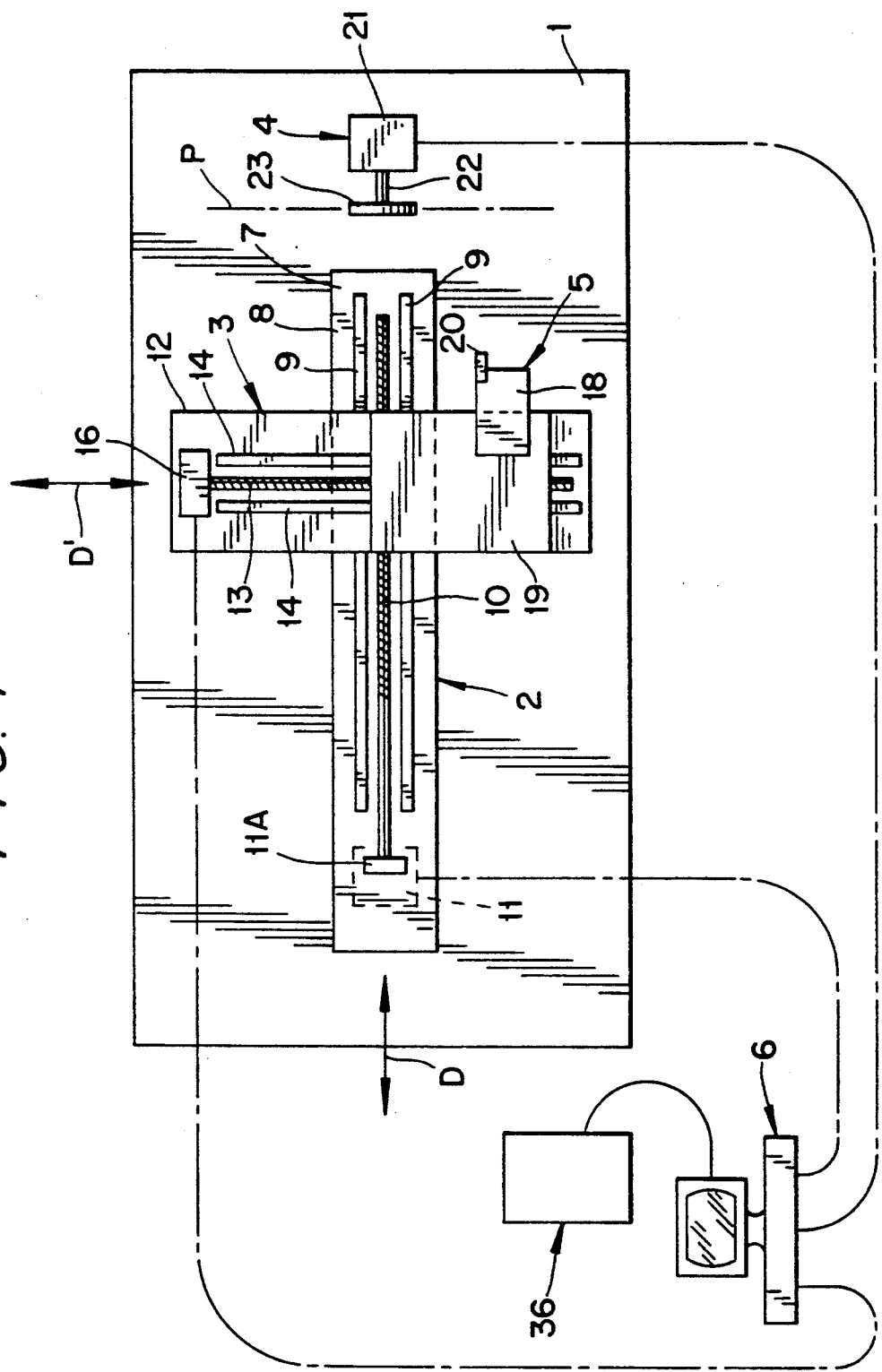
FIG. 1 is a schematic plan view of a lathe type lens making apparatus in accordance with the present invention.

Referring to FIGS. 1 and 2 of the accompanying drawings, there is shown a schematic representation of a lathe type lens making apparatus, the lathe being disclosed in copending U.S. patent application Ser. No. 07/766,394. The lathe is primarily intended, when set up, to cut complex surfaces, such as aspheric and toric shaped surfaces on surfaces rotating in a plane oriented transversely to the axis of rotation of a blank/workpiece.

The lathe is mounted on a support base 1 and comprises:
a) a first location and movement arrangement 2;
b) a second location and movement arrangement 3 allowing movement in a direction (or along an axis) oriented transverse to the direction (or axis) allowed by the first location and movement arrangement;
c) a lens mounting arrangement 4;
d) a cutting tool mounting means 5; and
e) a digital electronic system 6.

The first location and movement arrangement 2 includes:
i) a support 7 having a substantially flat upper surface 8, which support 7 is affixed to the support base 1;
ii) two parallel rails 9 mounted on the upper surface 8 of the support 7 so as to allow movement in one predetermined direction only;
iii) a screw threaded drive shaft 10 mounted between, and parallel with, the two mounted rails 9;
iv) a driver motor 11 mounted below the surface 8 and drivingly connected to the screw threaded drive shaft 10 by a transmission 11A; and
v) a block 12 which includes a pair of parallel guide channels 12A through which the rails 9 pass (see FIG. 2A) and a threaded member 12B with which the drive shaft 10 is threadedly connected such that rotation of the shaft 10 produces movement of the block means 12 in a first direction D toward and away from the mounting arrangement 4.

The screw threaded drive shaft 10 is provided with a close pitch screw thread in order to provide high accuracy in the positioning of the means moved by the first movement arrangement.

The second movement arrangement 3 includes:
i) the block means 12;
ii) a positioning member 19;
iii) two parallel mounted guides 15 affixed to the lower surface of the positioning member 19 (see FIG. 2) and positioned so as to engage with two parallel rails 14 mounted on a top surface of the block means 12;
iv) a screw threaded drive engaging means 17 provided on the lower surface of the positioning member 19, which drive engaging means 17 engages with a screw threaded shaft 13 mounted on the block means 12 parallel to the rails 14; and
v) a driver motor 16 drivingly connected to the second screw threaded drive shaft 13.

The screw shaft 13 and rails 14, 15 are oriented perpendicular to the screw shaft 10 and rails 9, so that actuation of the motor 16 causes the positioning member 19 to be displaced in a second direction D, perpendicularly to the first direction D.

The cutter tool mounting means 5 comprises a tool block 18 secured to the upper surface of the positioning member 19, and which carries a lathe cutter tool 20.

The lathe cutter tool 20 is calibrated to the lathe in the standard fashion and no further explanation is needed, or will be given as to this aspect.

The lens mounting arrangement 4 includes a standard lens carrying chuck 23 which is very similar to that provided in a majority of lathes. A driver motor 21 turns a spindle 22 that carries the chuck and is mounted at the appropriate height so that when lathing or generation is underway the blank/workpiece engages with the lathe cutter tool 20 under the control of the digital electronic system 6.

The overall operational control of the lathe is effected by means of the digital electronic system 6. The digital electronic system 6 is connected to the driver motors 11, 16 and 21, and acts to control the position of the block means 12 on the fixed rails 9 as well in order to control the position of the positioning member 19 on the fixed rails 14 of the block means 12 by controlling the drives to the respective screw threaded shafts 10, 13. The digital electronic system 6 also regulates the rotation of the spindle 22 to control the angular position of the workpiece/blank being operated upon by the lathe, with reference to a defined plane P defined by the blank/workpiece.

By controlling the motors in that manner, the base and cross curve characteristics of the curvature being cut can be determined.

It will be appreciated by those skilled in the art that the action of the two arrangements 2, 3 of parallel mounted rails and parallel mounted guides interacting with each other in transverse (perpendicular) directions in effect means that within the confines of the lathe the lathe cutter tool 20 can be located anywhere in the defined plane.

Normally, the blank/workpiece is generated or worked upon from the outside inwards towards the center of the blank/workpiece, i.e., towards the axis of rotation of the blank/workpiece. Now, assuming a constant angular velocity for the blank/workpiece as the lathe cutter tool 20 approaches the axis of rotation, the relative surface speed of the portion of the blank/workpiece engaged by the lathe cutter tool 20 diminishes.

This does not pose a problem when cutting certain materials, such as thermosetting materials. However, in order to effect a clean and useful cut of the blank/workpiece when cutting a plastically behaving material such as polycarbonate or aluminum, the relative speed of the blank/workpiece to the lathe cutter tool 20 has to be maintained above a threshold value; thus, it is clear that problems may arise.

To maintain sufficient surface speed, shorten the cycle time, and improve the surface finish, the angular velocity is accelerated during the cutting operation. In fact, the speed of rotation of the spindle 22 is increased as the lathe cutter tool 20 approaches the axis of rotation.

In the actual operation of lathe, the operator keys-in certain required criteria to the digital electronic system. This data includes: the type of material to be worked upon, the type of curve required (concave or convex), and the prescription information relating to the curve to be generated. The digital electronic system from this information has, or generates using algorithms, the control data it requires to effect control of the cutting operation.

During the actual cutting operation, the digital electronic system supplies at regular intervals, e.g., every 2 to 4 milliseconds, appropriate drive signals to the motors 11, 16 and 21 controlling the spatial and angular relationship of the blank/workpiece to the lathe cutter tool 20 so that the required surface shape is generated.

During the cutting of a workpiece formed of a plastically behaving material the following criteria are normally applied to the movement of the lathe cutter tool 20 and the rotation of the blank/workpiece:

the rotational velocity of the blank/workpiece is steadily increased as the lathe cutter tool approaches the axis of rotation of the blank/workpiece;

the movement (displacement) of the lathe cutter tool 20 by the second location and movement arrangement 3 is at a constant in-feed; and the movement (displacement) induced in the lathe cutter when generating a toric curve in a surface is oscillatory in nature, i.e., contains both positive and negative drive movements in the direction parallel to the axis of rotation of the blank/workpiece.

Figure 3A:
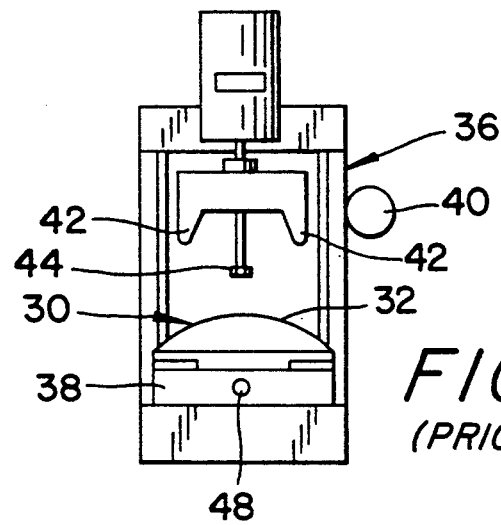
FIG. 3A is a front elevational view of a conventional digital gauge having a lap mounted thereon.
Figure 3B:
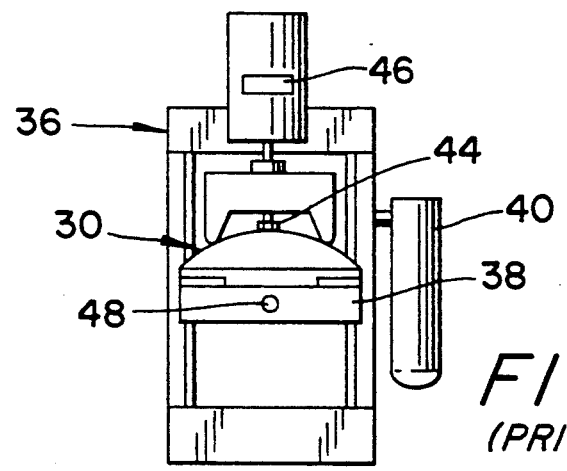
FIG. 3B is a view similar to FIG. 3A after the lap has been raised and the base curve characteristic thereof is being measured.
Figure 3C:
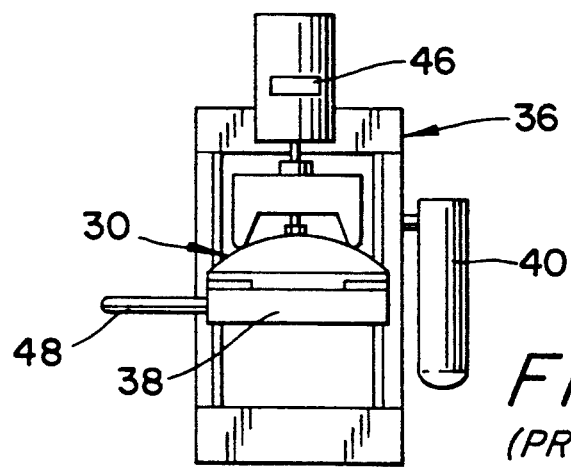
FIG. 3C is a view similar to FIG. 3B after the lap has been rotated so that the cross curve characteristics is being measured.

Heretofore, when used to produce a lens, the lathe is operated to cut an initial curvature in a lens blank which must then be finished. The finishing is performed by means of a conventional finishing tool comprised of a lap 30 (see FIG. 3A–C) which includes a convex surface 32 on which finishing pads, e.g., abrasive fining pads or polishing pads (not shown) are mounted. Normally, a three-step finishing procedure is performed consisting of rough fining, fine fining, and polishing. Abrasive pads are used for the two fining steps, and polishing pads are used for the polishing step.

During the finishing procedure, the curve characteristics of the lens curvature (e.g., a spherical curvature or a toroidal curvature) are brought into conformity with those of the finishing surface. The curve characteristics of the finishing surface are defined by the curvature of the lap surface 32 as enhanced by the thickness of the finishing pads and are chosen so as to correspond to the curve characteristics of the prescription within a prescribed tolerance. Often, an inventory of differently sized laps is kept on hand, and the operator simply selects the lap having a proper curvature.

However, due to the permissible tolerance, the curvature of the finishing surface may not exactly correspond to that of the prescription curvature which can be cut with precision by the afore-described lens generator. For example, a lap labeled as possessing a 5.00 diopter by 6.00 diopter toroidal curvature might, due to the permissible tolerance, actually possess a 4.99 diopter by 6.01 diopter curvature. Hence, the finished curvature of the lens will be 4.99 diopter by 6.01 diopter (which is within the acceptable error range for the prescription). However, the presence of this error means that a 4.99 diopter by 6.01 diopter finishing surface would be used to finish a 5.00 diopter by 6.00 diopter curvature initially cut into the lens blank. That difference is indicative of the amount of material which must be removed from the lens surface during the finishing process, and thereby lengthens the finishing period. In that regard, a two-step fining procedure (rough fining and fine fining), or a longer single-step fining step, would be required prior to a polishing step.

In accordance with the present invention however, the finishing period is shortened, in that the initial curvature cut into the lens by the lathe is configured to correspond to the curvature of the finishing surface, i.e., the curvature of the lap with compensation for pad thickness. Hence, there will exist no appreciable difference between those two curvatures, and the finishing procedure can be performed rapidly and usually without the need for a rough fining step. It is expected that most finishing procedures can be reduced by at least several minutes, which represents considerable savings in high volume lens making operations.

The invention is carried out by connecting a conventional digital gauge 36 to the digital controller 6 of the lathe. The gauge 36, such as a Sony U30 digital sagittal indicator (available from Coburn Optical Industries) is provided with a conventional vertically slidable base 38 on which a lap 30 can be mounted. For example, in the case of a toroidal curvature, by pivoting a handle 40, the base is raised to bring the convex surface 32 of the lap into contact with the legs 42 and probe 44 of the gauge (see FIG. 3B) in order to obtain a visual digital readout at 46 of the base curve characteristic of the lap surface. By then rotating the base 38 and lap 30 about a vertical axis by means of a handle 48 (FIG. 3C), a visual digital readout of the cross curve characteristic can be obtained at 46.

Such a gauge has conventionally been used to precisely measure the accuracy of lap surfaces. An output of the gauge can be connected to a conventional digital printer (not shown) to obtain a printout of the measurements, if desired.

In accordance with the present invention, however, the output of the gauge is connected to the digital controller 6 so that the precise measurements of the lap surface can be fed directly into the controller 6. The controller is also programmed with data relating to the thickness of the finishing pads, so that the programmer can precisely determine the curve characteristics of the finishing surface (i.e., lap surface plus finishing pads).

An operator can enter into the controller the curve characteristics of the prescription, so that the programmer 6 can determine whether the curvature of the finishing surface lies within the acceptable tolerance. If so, then the programmer actuates the motors 11, 16, 21 to cause the machine to cut into the lens surface an initial curvature whose curve characteristics correspond to those of the finishing surface.

Subsequently, the lens is removed from the machine and is inserted into a finishing apparatus along with the finishing tool (i.e., the lap 30 plus finishing pads). A suitable finishing apparatus is disclosed in U.S. Pat. No. 4,907,373 for performing the fining and polishing steps. Due to the high degree of dimensional correspondence between the curvatures of the lens surface and the finishing surface prior to the initiation of the finishing operation, that finishing operation can be performed quickly, usually without the need for a rough fining step. Thus, the finishing procedure would comprise a short fine fining step and a short polishing step. Following the fining step, the fining pads on the lap would be replaced by polishing pads for the polishing step.

By reducing the length of the finishing period, the rate of lens production can be increased.

Although the present invention has been described in connection with preferred embodiments thereof it will be appreciated by those skilled in the art that additions, modifications, substitutions, and deletions not specifically described may be made without departing from the spirit and scope of the invention as defined in the appended claims.

What is claimed is:

1. In a method of producing an ophthalmic lens, wherein an initial curvature is cut into a lens blank and is thereafter finished by a finishing tool having finishing curve characteristics substantially corresponding to prescription curve characteristics within a prescribed tolerance, the improvement comprising the steps of determining said finishing curve characteristics of said finishing tool, and producing said initial curvature in said lens blank such that differences between said finishing curve characteristics and said prescription curve characteristics are incorporated into said initial curvature.

2. A method according to claim 1, wherein said finishing tool comprises a lap presenting a lap curvature, and finishing pads mounted on said lap curvature to define, together with said lap curvature, said finishing curve characteristics, said determining step including measuring said lap curve characteristics on a digital gauge, and supplying signals from said gauge to a digital controller of an apparatus which produces said initial curvature.

3. Apparatus for producing an initial curvature in an ophthalmic lens blank which is to be subsequently finished by a finishing tool having finishing curve characteristics substantially corresponding to prescription curve characteristics within a prescribed tolerance, said apparatus comprising:
   a cutter tool,
   supporting means for supporting said lens blank and cutter tool and effecting relative movement therebetween for producing said initial curvature,
   a digital controller connected to said supporting means for supplying control signals thereto for effecting the production of said initial curvature, and
   a digital gauge connected to said digital controller for measuring lap base and cross curve characteristics of a lap curvature of a lap portion of the finishing tool and for delivering to said digital controller signals indicative of such measured characteristics such that said digital controller actuates said supporting means for producing said initial curvature with characteristics corresponding to said finishing curve characteristics.

4. Apparatus according to claim 3, wherein said digital controller includes means for determining said finishing curve characteristics as a function of both said measured lap curvature and a thickness of finishing pads mounted thereon.

5. Apparatus according to claim 3, wherein said cutter tool comprises a lathe cutter tool, said supporting means comprises rotating means for rotating a lens blank about an axis of rotation, first moving means for effecting relative movement between said lathe cutter tool and the lens blank in a first direction oriented parallel to said axis of rotation of the lens blank, and second moving means for effecting relative movement between said cutter tool and the lens blank in a second direction oriented transversely to said first direction; digital controller being connected to said rotating means and to said first and second moving means for supplying control signals controlling the angular displacement of the blank with respect to a reference plane containing the blank, and controlling the movement of said lathe cutter tool in said first and second directions, such that the movements of said lathe cutter tool along said first and second directions and the angular displacement of the blank about said axis of rotation are all controlled independently of one another by means of control signals supplied at regular time intervals.

6. A method of producing an ophthalmic lens according to prescription curve characteristics, said method comprising the steps of:
   selecting a finishing tool according to said prescription curve characteristics;
   measuring finishing curve characteristics of said finishing tool;
   producing an initial curvature in a lens blank such that said finishing curve characteristics determine said initial curvature; and
   fining said initial curvature to finish a side of said ophthalmic lens.

7. A method according to claim 6, wherein said measuring step includes measuring said lap curve characteristics with a digital gauge.

8. Apparatus for producing an initial curvature in an ophthalmic lens blank which is to be subsequently finished by a finishing tool having finishing curve characteristics substantially corresponding to prescription curve characteristics within a prescribed tolerance, said apparatus comprising:
   a digital gauge for measuring curve characteristics of a lap curvature of a lap portion of the finishing tool,
   a cutter tool,
   supporting means for supporting said lens blank and cutter tool and effecting relative movement therebetween for producing said initial curvature, and
   a digital controller connected to said digital gauge for receiving signal indicative of such measured characteristics to said support means and for supplying control signals to said supporting means to effect the production of said initial curvature, such that said digital controller actuates said supporting means for producing said initial curvature with characteristics corresponding to said finishing curve characteristics taking into consideration said measured curve characteristics of said lap portion of the finishing tool.

9. Apparatus according to claim 8, wherein said digital controller includes means for determining said finishing curve characteristics as a function of both said measured lap curvature and a thickness of finishing pads mounted thereon.

10. Apparatus according to claim 8, wherein said digital controller includes means for determining said finishing curve characteristics according to said measured lap curvature and a thickness of finishing pads mounted thereon.

11. Apparatus according to claim 8, wherein said cutter tool comprises a lathe cutter tool; said supporting means comprises rotating means for rotating a lens blank about an axis of rotation, first moving means for effecting relative movement between said lathe cutter tool and the lens blank in a first direction oriented parallel to said axis of rotation of the lens blank, and second moving means for effecting relative movement between said cutter tool and the lens blank in a second direction oriented transversely to said first direction; digital controller being connected to said rotating means and to said first and second moving means for supplying control signals controlling the angular displacement of the blank with respect to a reference plane containing the blank, and controlling the movement of said lathe cutter tool in said first and second directions, such that the movements of said lathe cutter tool along said first and second directions and the angular displacement of the blank about said axis of rotation are all controlled independently of one another by means of control signals supplied at regular time intervals.

* * * * *